United States Patent [19]

Georges et al.

[11] Patent Number: 5,549,998
[45] Date of Patent: Aug. 27, 1996

[54] POLYMERIZATION PROCESS AND TONER COMPOSITIONS THEREFROM

[75] Inventors: Michael K. Georges, Guelph; Richard P. N. Veregin, Mississauga; Peter M. Kazmaier, Mississauga; Gordon K. Hamer, Mississauga, all of Canada

[73] Assignee: Xerox Corporation, Stamford, Conn.

[21] Appl. No.: 363,083

[22] Filed: Dec. 23, 1994

Related U.S. Application Data

[62] Division of Ser. No. 181,134, Jan. 13, 1994, Pat. No. 5,401,804, which is a division of Ser. No. 976,604, Nov. 16, 1992, Pat. No. 5,322,912.

[51] Int. Cl.⁶ ............................................. G03G 9/08
[52] U.S. Cl. ......................... 430/109; 430/111; 430/137
[58] Field of Search ................................... 430/109, 111, 430/137

[56] References Cited

U.S. PATENT DOCUMENTS 5,145,762  9/1992  Grushkin .................................. 430/137
5,215,846  6/1993  Fuller et al. ............................. 430/106

*Primary Examiner*—Mark Nagumo
*Attorney, Agent, or Firm*—John L. Haack

[57] ABSTRACT

Disclosed is a free radical polymerization process for the preparation of a thermoplastic resin or resins comprising heating a mixture of a free radical initiator, a stable free radical agent, and at least one polymerizable monomer compound to form a thermoplastic resin or resins with a high monomer to polymer conversion; cooling said mixture; optionally isolating the thermoplastic resin or resins; and optionally washing and drying thermoplastic resin or resins.

Related free radical processes are also disclosed for the preparation of mixtures and block copolymer thermoplastic resins. Resins prepared by the disclosed processes possesses a narrow polydispersity and a modality that is controlled by the selection of a free radical initiator and stable free radical agent addition step or steps.

16 Claims, 1 Drawing Sheet

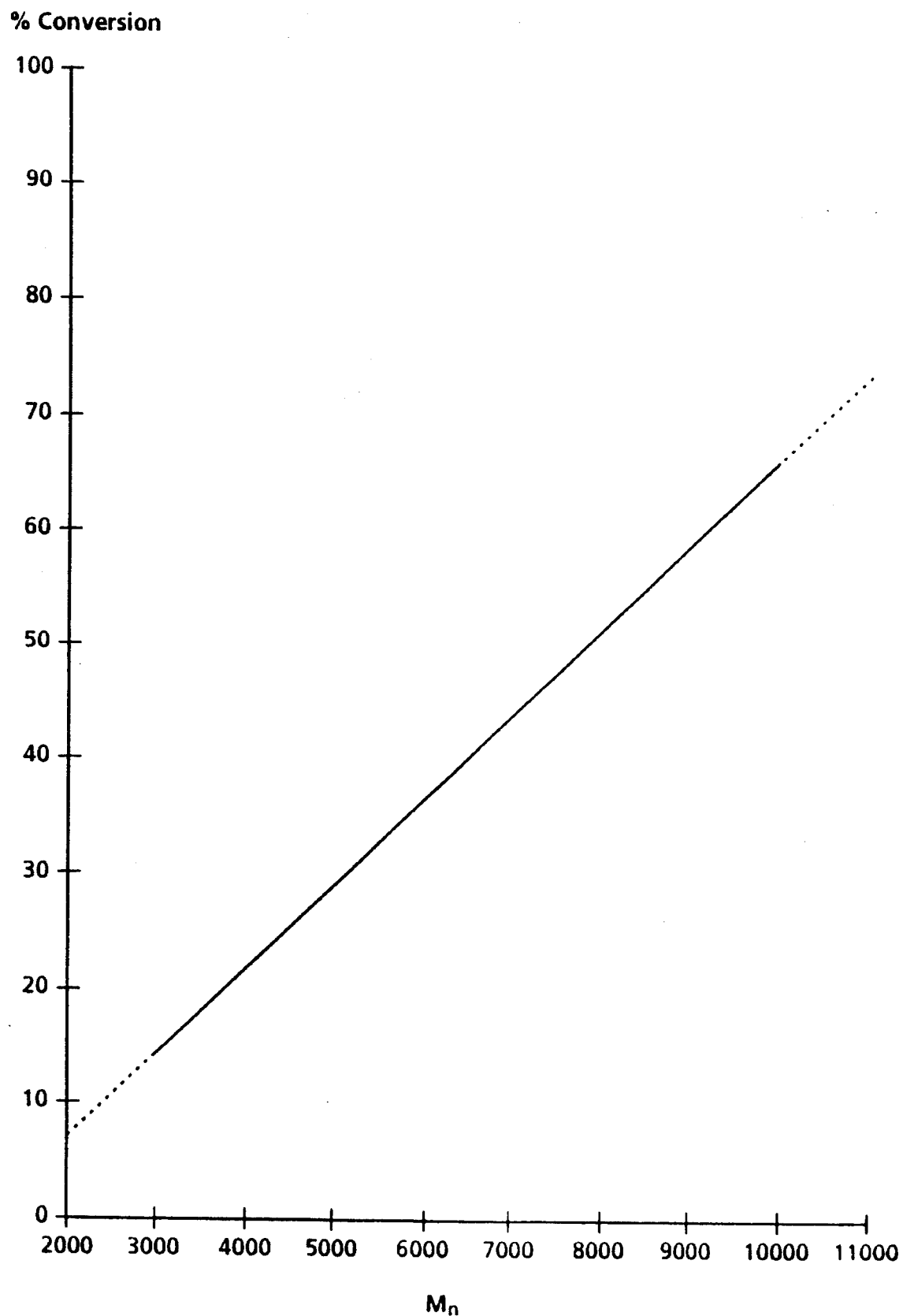

POLYMERIZATION PROCESS AND TONER COMPOSITIONS THEREFROM

This is a division of application Ser. No. 08/181,134, filed Jan. 13, 1994, now U.S. Pat. No. 5,401,804, which is a division of Ser. No. 07/976,604, filed Nov. 16, 1992, U.S. Pat. No. 5,322,912, issued Jun. 21, 1994.

BACKGROUND OF THE INVENTION

The present invention relates to processes for the preparation of polymers, and more specifically to a polymerization process and to the polymer formed thereby. In one embodiment, the present invention relates to a stable free radical moderated process for producing a thermoplastic polymer resin or resins, that have narrow polydispersities, that is, narrow molecular weight distributions as defined by the ratio $M_w:M_n$, where $M_w$ is weight average molecular weight and $M_n$ is number average molecular weight, and easily controllable modality, from at least one monomer compound comprising heating for an effective period of time a mixture of a free radical initiator, a stable free radical agent, and at least one polymerizable monomer compound under conditions such that all polymer chain formations are initiated at about the same time; cooling the mixture to effectively terminate the polymerization; isolating the thermoplastic resin product; and optionally washing and drying the polymer resins. The polymer resins produced by the process of the present invention in embodiments are essentially monomodal and in embodiments by repeating the heating step, that is, the combined initiation and polymerization step, provides a means for obtaining mixtures of monomodal polymer resins, that are compositionally the same resin type having characteristics of both narrow polydispersity and known or selectable modality. In another embodiment the process of the instant invention provides a means for conducting bulk or neat free radical polymerization processes on multikilogram or larger scales. The aforementioned embodiments may be accomplished in a one or single pot reactor environment. In another embodiment polymeric chain growth proceeds by a pseudoliving mechanism and can provide resins of variable molecular weights from very low to very high, for example, less than about 10,000 up to about 200,000 while maintaining narrow molecular weight distributions or polydispersities. In another embodiment block copolymers can be synthesized by the aforementioned stable free radical moderated free radical polymerization processes wherein each block formed is well defined in length by the reacted monomer and wherein each block formed possesses a narrow molecular weight distribution.

Of the known polymerization processes a preferred way to prepare polymers or copolymers having a narrow molecular weight distribution or polydispersity is by anionic processes. The use and availability of resins having narrow polydispersities in industrial applications is limited because anionic polymerization processes must be performed in the absence of atmospheric oxygen and moisture, require difficult to handle and hazardous initiator reagents and consequently such polymerization processes are generally limited to small batch reactors. In addition, the monomers and solvents that are used must be of high purity and anhydrous rendering the anionic process more expensive than alternatives which do not have these requirements. Thus, anionic polymerization processes are difficult and costly. It is desirable to have a free radical polymerization process that would provide narrow molecular weight distribution resins that overcome the shortcomings and disadvantages of the aforementioned anionic polymerization processes.

Free radical polymerization processes are chemically less sensitive to impurities in the monomers or solvents typically used and are completely insensitive to water. There has been a long felt need for an economical free radical polymerization process which is suitable for preparing narrow polydispersity resins by suspension, solution, bulk or neat, emulsion and related processes.

Copolymers prepared by free radical polymerization processes inherently have broad molecular weight distributions or polydispersities, generally greater than about five. One reason is that free radical initiators have half lives that are relatively long, from several minutes to many hours, and polymeric chains are not all initiated at the same time and which initiators provide growing chains of various lengths at any time during the polymerization process. Another reason is that the propagating chains in a free radical process can react with each other in processes known as coupling and disproportionation, both of which are chain terminating reactions. In doing so, chains of varying lengths are terminated at different times during the reaction process which results in resins comprised of polymeric chains which vary widely in length from very small to very large. If a free radical polymerization process is to be enabled for producing narrow molecular weight distributions, then all polymer chains must be initiated at about the same time and premature termination by coupling or disproportionation processes must be avoided.

Otsu et.al., in *Makromol Chem.*, Rapid Commun., 3, 127 (1982), introduced the use of iniferters as a means of producing block copolymers by a free radical polymerization process. A mechanism proposed for the reaction suggested that a pseudoliving propagating free radical chain exists and that it continues to grow with time. There are two major drawbacks associated with using iniferters. Iniferters tend to react very slowly and the percent conversion or degree of polymerization of monomer to polymer is low, for example, about 40 percent even after 20 hours of reaction time. Another drawback is that the free radical trap that caps the end of the growing chain has the ability to initiate new chains at any time during the course of the reaction, see for example, S. R. Turner, R. W. Blevins, in *Polymer Reprints*, 29(2), Sept. 1988. This initiation leads to new chains being initiated at various times during the polymerization and consequently leads to broadening of the polydispersity. Although the approach in the aforementioned reference of Otsu was novel in using pseudoliving free radical propagating chains, it was not applicable to the synthesis of narrow molecular weight distribution resins particularly for polymers with high molecular weights.

The use of stable free radicals are well known as inhibitors of free radical polymerizations, see for example, G. Moad et.al., *Polymer Bulletin* 6, 589 (1982). Studies by, for example, G. Moad et.al. *J.Macromol. Sci.-Chem.*, A 17(1), 51(1982) have reported on the use of stable free radicals as inhibitors of free radical polymerizations performed at low temperatures, for example, below 90° C. and at low monomer to polymer conversions. Little is known concerning the reaction of stable free radical agents at higher temperatures and at high monomer to polymer conversions.

In a hypothetical free radical polymerization of styrene, in which chains are continually initiated over the course of the polymerization, and where chain termination by coupling processes is also occurring, calculations as described in, for example, G. G. Odian, *Principles of Polymerization*, pages 280–281, 2nd Ed., John Wiley & Sons, 1981 have shown that the narrowest polydispersity that one can theoretically possibly obtain is 1.5. In practice, polydispersities much greater than 1.5 are actually obtained. Polydispersities of between 2.0 and 2.4 are typical for free radical homopolymerizations of styrene. In the case of copolymer systems, polydispersities of greater than 4 are generally obtained.

The stable free radical polymerization system of the instant invention may readily afford polydispersities of between 1.15 and 1.25 for polystyrene and as low as 1.5 for various copolymer systems. Stable free radical polymerization systems of the instant invention afford polydispersities that are comparable to those obtained in anionic polymerizations.

In a patentability search report the following patents were recited:

U.S. Pat. No. 4,581,429 to Solomon et al., issued Apr. 8, 1986, discloses a free radical polymerization process which controls the growth of polymer chains to produce short chain or oligomeric homopolymers and copolymers including block and graft copolymers. The process employs an initiator having the formula (in part) =N—O—X, where X is a free radical species capable of polymerizing unsaturated monomers. The molecular weights of the polymer products obtained are generally from about 2,500 to 7,000 having polydispersities generally of about 1.4 to 1.8, at low monomer to polymer conversion. The reactions typically have low conversion rates and use relatively low reaction temperatures of less than about 100 degrees C., and generally use multiple stages.

U.S. Pat. No. 5,059,657 to Druliner et al., issued Oct. 22, 1991, discloses a polymerization process for acrylic and maleimide monomers by contacting the monomers with a diazotate, cyanate or hyponitrite, and N-chlorosuccinimide, N-bromosuccinimide or a diazonium salt. The polymer produced can initiate further polymerization, including use in block copolymer formation.

In free radical polymerization reaction processes of the prior art, various significant problems exist, for example difficulties in predicting or controlling the polydispersity and modality of the polymers produced. These free radical polymerization processes invariably produce polymers with high weight average molecular weights ($M_w$) and low number average molecular weights ($M_n$) resulting in broad polydispersities. Further, bulk or neat free radical polymerization processes of the prior art are prone to generating excessive quantities of heat since the polymerization reaction is exothermic and as the viscosity of the reaction medium increases dissipation of heat becomes more difficult. This is referred to as the Trommsdorff effect as discussed and illustrated in *Principles of Polymerization,* G. Odian, 2nd Ed., Wiley-Interscience, N.Y., 1981, page 272, the disclosure of which is entirely incorporated herein by reference. Moreover, the exothermic nature of free radical polymerization processes is often a limitation that severely restricts the concentration of reactants or the reactor size upon scale up.

It is known to form resins by bead suspension polymerization reference for example U.S. Pat. Nos. 4,601,968 and 4,609,607, the disclosures of which are totally incorporated herein by reference.

Illustrated in application U.S. Ser. No. 07/812,082, filed Dec. 23, 1991, now U.S. Pat. No. 5,274,057 (D/90515), the disclosure of which is incorporated by reference herein in its entirety, is that free radical suspension polymerization reactions may also lead to undesirable deposits of polymer on the agitator, baffles, heating coils and reactor walls. In some situations, the suspension coalesces during the reaction producing large deposits of undesirable polymeric gel material which is difficult, expensive and hazardous to remove from the reactor.

Further, gel body formation in conventional free radical polymerization processes may result in a broad molecular weight distributions and/or difficulties encountered during filtering, drying and manipulating the product resin.

These and other disadvantages are avoided, or minimized with the processes of the present invention.

Thus, there remains a need for processes for the preparation of narrow polydispersity polymeric resins by economical and scalable free radical polymerization techniques and which polymers retain many or all of their desirable physical properties, for example, hardness, low gel content, processability, clarity, high gloss durability, and the like, while avoiding the problems of gel formation, exotherms, volume limited and multi-stage reaction systems, purification, performance properties of the polymer resin products, and the like associated with prior art free radical polymerization methodologies.

The polymerization processes and thermoplastic resin products of the instant invention are useful in many applications, for example, as a variety of specialty applications including toner resins used for electrophotographic imaging processes or where monomodal or mixtures of monomodal narrow molecular weight resins or block copolymers with narrow molecular weight distribution within each block component are suitable such as in thermoplastic films and coating technologies.

SUMMARY OF THE INVENTION

An object of the present invention is to provide processes and polymers that overcome many of the problems and disadvantages of the aforementioned prior art.

Another object of the instant invention is to provide a free radical polymerization reaction system which affords narrow polydispersity homopolymeric or copolymeric thermoplastic resin products.

In another object of the instant invention is to provide a free radical polymerization reaction system which may be conducted in the presence or absence of conventional reaction media.

In yet another object of the instant invention, coupling or disproportionation termination reactions are prevented by reversibly terminating the propagating free radical chains with a stable free radical agent which serves to moderate the free radical polymerization process.

In another object of the instant invention is provided the acceleration of the dissociation of the free radical peroxide initiator by the addition of promoter compounds which include, for example, tertiary amines, which ensure that all polymeric chains are initiated nearly simultaneously or about the same time.

In another object of the instant invention is the addition of small amounts of organic acids, for example, sulfonic or carboxylic acids, to the reaction medium to increase the rate of reaction without broadening the polydispersity of the polymeric resins.

Still another object of the instant invention is to prepare thermoplastic resins by single pot processes employing a monomer or monomers, a suitable azo or peroxide free radical initiator, and a stable free radical agent.

Another object of the instant invention is to prepare resins using polymerization processes wherein the molecular weight of the growing copolymer chains increase over the entire time period of the polymerization reaction and wherein the percent conversion or degree of polymerization of monomer to polymer with respect to time or number average molecular weight is approximately linear, that is, polymerization processes which occur without the aforementioned Trommsdorff effect.

In embodiments, the present invention overcomes the problems and disadvantages of the prior art by forming narrow polydispersity polymeric resins by means, for example, a free radical polymerization process comprising heating a mixture of a free radical initiator, a stable free radical agent, and at least one polymerizable monomer compound to form thermoplastic resin or resins with a high monomer to polymer conversion; cooling the mixture; optionally isolating said thermoplastic resin or resins; and optionally washing and drying the thermoplastic resin or resins and wherein the thermoplastic resin or resins possess a narrow polydispersity.

Another embodiment of the present invention is a free radical polymerization process for the preparation of thermoplastic resins comprising heating a first mixture comprised of a free radical initiator, a stable free radical agent, and at least one polymerizable monomer compound to form a first intermediate product resin; optionally cooling the first mixture; adding to the first intermediate product resin a second mixture comprised of a free radical initiator, a stable free radical agent, and at least one polymerizable monomer compound, wherein the polymerizable monomer compound of the second mixture is the same as the polymerizable monomer compound of the first mixture, and the free radical initiator and the stable free radical agent of the second mixture are the same or different from the free radical initiator and the stable free radical agent of the first mixture, to form a combined mixture; heating the combined mixture to form a third mixture comprised of a mixture of thermoplastic resins comprised of a first product resin formed from the first intermediate product resin and added the second monomer and a second product resin formed from the second monomer; cooling the third mixture; optionally isolating the mixture of thermoplastic product resins from the third mixture; and optionally washing and drying the mixture of thermoplastic resins and wherein the first product resin and the second product resin each possess a narrow polydispersity and the mixture of thermoplastic resins possesses a modality equal to 2. Higher modalities, for example, of from 3 to about 20 may be conveniently achieved if desired by the subsequent addition of fresh mixtures of monomer, free radical initiator and stable free radical agent prior to a final cooling and isolation step.

In another embodiment of the instant invention is a free radical polymerization process for the preparation of a block copolymer thermoplastic resin or resins comprising heating a first mixture comprised of a free radical initiator, a stable free radical agent, and at least one polymerizable monomer compound to form a first intermediate product resin; optionally cooling the first mixture; optionally isolating the first intermediate product resin; adding to the first intermediate product resin a second mixture comprised of at least one polymerizable monomer compound, wherein the polymerizable monomer compound of the second mixture is different from the polymerizable monomer compound of the first mixture, to form a combined mixture; heating the combined mixture to form a third mixture comprised of a block copolymer thermoplastic resin comprised of a first product resin formed from the first intermediate product resin and added the second monomer; cooling the third mixture; optionally isolating the block copolymer thermoplastic resin from the third mixture; and optionally washing and drying the block copolymer thermoplastic resin and wherein the block copolymer possesses a narrow polydispersity and a modality equal to 1. The isolation of the intermediate product resin is preferred when highest purity and block integrity or homogenity is desired, that is, residual unreacted monomer or monomers of the first mixture may subsequently react with and be integrated into the growing polymer chain formed from the second mixture of polymerizable monomer compounds. Thus, in preparing block copolymers by processes of the instant invention isolation by, for example, precipitation of intermediate products of polymerization reactions is preferred when high purity is desired or when the degree of polymerization is less than about 70 to 90 percent for a block or multiblock polymerization reaction.

In yet another embodiment of the present invention is a free radical polymerization process for the preparation of a thermoplastic resin comprising heating for an effective period a water suspension mixture of a peroxide free radical initiator, a nitroxide stable free radical agent, and at least one polymerizable monomer compound to form the thermoplastic resin with a high monomer to polymer conversion; cooling the mixture; isolating the thermoplastic resin; and optionally washing and drying the thermoplastic resin and wherein the thermoplastic resin possesses a narrow polydispersity of about 1.1 to about 1.5 and a modality of 1.

In embodiments of the aforementioned processes, polymer or copolymer resin compositions are obtained wherein the resin or resins has a weight average molecular weight ($M_w$) of from about 10,000 to 200,000 and a number average molecular weight ($M_n$) of from about 9,000 to about 100,000 and a polydispersity of about 1.1 to 2.0.

Although not being desired to be limited by theory, it is believed that when polymerization reaction processes of the instant invention are performed at a temperature at about or above 100 degrees C., the exact temperature depending on the initiator used, all the polymer chains are expected to be initiated at about the same time which is a primary reason for enabling forming polymer chain products having narrow polydispersities.

The aforementioned undesirable chain coupling or disproportionation termination reactions, so prevalent under the conditions of the prior art free radical polymerization systems, is suppressed under the conditions of the instant invention because the effective concentration and availability of living free chains is extremely small. In addition, stable free radical agents of the instant invention do not initiate polymerization so that new chains are not initiated after an initial period during which all polymer chains are initiated at about the same time.

Propagating chains of the instant invention are referred to as pseudoliving because the stable free radical agent adds to a propagating chain and the chain is temporarily, but reversibly, terminated. As shown in the accompanying scheme, the propagating polymer chain fluctuates or is in an equilibrium condition between being temporarily terminated or suspended and being alive or living. As thermal energy is supplied from the reaction system to the bond joining the growing polymeric chain and the stable free radical (●SFR) agent, that is, the adduct in the accompanying scheme where, for example, the stable free radical agent (●SFR) is covalently bound to the propagating chain, for example, a substituted styrene, homolytically cleaves thereby temporarily generating a living chain end radical species shown in square brackets[] permitting another monomer unit to insert or add to the chain and is again instantaneously, albeit short lived as determined by diffusion control, terminated or protected by the stable free radical agent as a thermally lablie adduct above about 80° to 100° C. or latent free radical chain. The free radical initiator, for example, benzoyl peroxide, is represented in the scheme as ●INIT. The term "protected" as used herein is meant to suggest that the chain radical species is available for selective rather than indiscriminant further reaction with monomer. An unmoderated free radical polymerization chain, that is, a free radical polymerization process without a stable free radical agent present, in contrast has a reactive or "open" chain end throughout the reaction.

Processes of the present invention further comprises in an embodiment a means for sequentially repeating the monomer addition or polymerization step and with additional stable free radical and free radical initiator of the process being added, N times, to provide a well defined mixture of thermoplastic resins wherein each resin in the mixture is comprised of polymers having discrete and narrow polydispersities and wherein the mixture has a modality equal to N+1 wherein N is the number of times the addition step of initiator, stable free radical agent and monomer is repeated.

The present invention provides several specific advantages in embodiments as follows.

With the process of the present invention, polymer product polydispersities can be varied from between approximately 1.1 to approximately 2.0 depending on the monomer/comonomer system by varying the ratio of stable free radical agent to free radical initiator molar concentration. When the polymerization process conditions of the present invention are attempted without using the a SFR additive, broad molecular weight resins are obtained.

The stable free radical agent moderated polymerization reactions may be performed in a variety of media for example, suspension, emulsion, bulk, that is neat or without solvent, or in aqueous or nonaqueous solution, using preferably higher boiling solvents such as, toluene and xylene.

During the reaction of monomer or mixed monomers to form polymers, the reaction time may be varied over about 1 to 60 hours, preferably between about 2 to 10 hours and optimally about 4 to 7 hours. The optimal reaction time may vary depending upon the temperature, the volume and scale of the reaction, and the quantity and type of polymerization initiator and stable free radical agent selected.

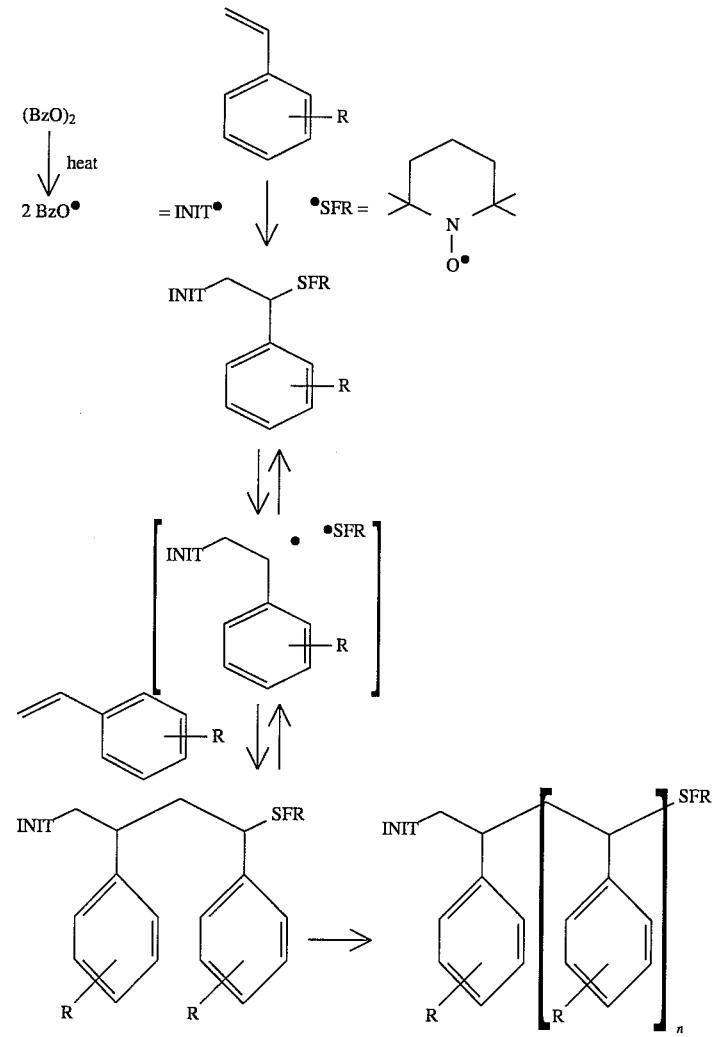

The polymerization reaction temperature is kept relatively constant throughout the heating step by providing an adjustable external heat source and the temperature is from about 60° C. to about 160° C., and preferably between 100° C. and 150° C. and optimally in embodiments about 120° C. to 140° C. Reactions performed above 160° C. tend to result in a broadening of the polydispersity. A reaction volume may be selected for any size that enables simple adding, mixing, reacting and isolating the product resins on an economic or convenient scale.

The free radical initiator can be any free radical polymerization initiator capable of initiating a free radical polymerization process and includes peroxide initiators such as benzoyl peroxide and azo initiators such as azobisisobutyronitrile, and the like. The initiator concentration employed is about 0.2 to 2.5 weight percent, of the total weight of monomer to be polymerized and is determined by the desired molecular weight of the resin. As the initiator concentration is decreased relative to the weight of molar equivalents of monomer used, the molecular weight of the thermoplastic resin product increases.

The stable free radical agent can be any stable free radical and includes nitroxide free radicals, for example, PROXYL (2,2 5,5-tetramethyl- 1-pyrrolidinyloxy) and derivatives thereof, and TEMPO (2,2,6,6-tetramethyl- 1-piperidinyloxy) and derivatives thereof, and the like. These stable free radical agent materials are well known in the literature, for example G. Moad et.al., *Tetrahedron Letters*, 22, 1165 (1981) as free radical polymerization inhibitors. However, under the polymerization conditions of the instant invention stable free radical agents function as moderators to harness the normally highly reactive and indiscriminate intermediate free radical species.

The molar ratio of the stable free radical (SFR) agent to free radical initiator (INIT) is from about 0.4 to 2.5, and preferably in the range from about 0.9 to 1.6. Although not wanting to be limited by theory, in an embodiment, the molar ratio [SFR:INIT.] of stable free radical agent, for example, TEMPO, to free radical initiator, for example, benzoyl peroxide, of about 1.3 is believed to be important for success of the process. If the [SFR:INIT.] is too high then the reaction rate is noticeably inhibited. If the [SFR:INIT.] is too low then the reaction product has undesired increased polydispersity. It should be noted that when styrene is polymerized to polystyrene without the stable free radical agent of the instant process the product polymers isolated have polydispersities of 2.0 and above.

In embodiments, the molar ratio of monomer content to stable free radical agent to free radical initiator is from about 100:0.2:1 to about 10,000:2.5:1 and preferably in the range of about 300:1.3:1 to about 7,000:1.3:1.

Processes of the instant invention, in embodiments, provide for high monomer to polymer conversion rates, or degrees of polymerization, for example of 90 percent by weight or greater.

Processes of the instant invention, in embodiments provide for relatively high weight average molecular weights, from weight average molecular weights ranging in size of from about 10,000 to about 200,000.

The monomers that can be used are any monomer capable of undergoing a free radical polymerization and include but are not limited to styrene, substituted styrenes and derivatives thereof, for example methylstyrene, acrylates, methacrylates, butadiene and any conjugated diene monomer sufficiently reactive under the specified stable free radical moderated polymerization reaction conditions to afford a stable free radical reaction adduct and high molecular weight polymer product for example, isoprene and myrcene.

The polymerization reaction rate of the monomers may, in embodiments, be accelerated and the reaction time reduced to about 4 to 7 hours from greater than 16 hours by the addition of a catalytic amount of a protic acid, that will not also initiate cationic polymerization, selected from the group consisting of organic sulfonic and carboxylic acids where camphorsulfonic acid is a preferred acid and where the molar ratio of stable free radical to acid is from about 1:1 to 11:1, with a preferred ratio of between about 1.5:1 and 5:1. Excessive addition of organic acid beyond the aforementioned amounts causes the resin polydispersity to broaden.

The stable free radical moderated polymerization process of the instant invention may be repeated a number of times within the same reaction vessel by the delayed and stepwise addition of more monomer or monomers with varying amounts of initiator and stable free radical agent to form a mixture of monomodal resins where each component has a distinct molecular weight and has a narrow molecular weight distribution and wherein the mixture has a modality of N+1, where N represents the number of additional times that monomer, initiator and stable free radical agent are added.

By cooling the polymerization reaction to below 60° to 80° C., the stable free radical moderated reaction is effectively quenched or terminated. Each new or subsequent addition of monomer, stable free radical and initiator accompanied by heating provides a new polymeric species having a narrow molecular weight distribution and each new polymer species continues to grow independent of the other polymer species already established.

Alternatively, block copolymer resins may also be prepared whereby after each desired block has been formed a new monomer or monomers is added without the addition of more initiator or stable free radical agent to form a new block wherein each block component is well defined in length and has a narrow molecular weight distribution and having properties depending on the repeated sequence and the monomers chosen for incorporation.

Additional optional known additives may be used in the polymerization reactions which do not interfere with the objects of the invention and which may provide additional performance enhancements to the resulting product, for example, colorants, lubricants, release or transfer agents, surfactants, stabilizers, antifoams, and the like.

Polymer resins possessing discrete mixture of monomodal, that is a well defined multimodal molecular weight distribution may in embodiments thereof provide several advantages, particularly for electrophotographic toner compositions such as: melt rheology properties including improved flow and elasticity; and improved performance properties such as triboelectrification, admix rates and shelf life stabilities.

The processes of the present invention can be selected to form a wide variety of polymers. For example, it can be used to polymerize a styrene monomer to form polystyrene or butadiene to form polybutadiene. The process of the present invention can be selected to polymerize a mixture of two or more different polymerizable monomers to form copolymers therefrom, for example, polymerization of styrene and butadiene to form poly(styrene-butadiene), styrene and isoprene to form poly(styrene-isoprene), styrene and acrylate to form poly(styrene-acrylate), styrene and methyl methacrylate to form poly(styrene-methyl methacrylate), and the like, and combinations thereof, including copolymers and terpolymers.

A suitable reaction medium employed for conducting processes of the instant invention may be selected from the group consisting of bulk or neat, suspension, emulsion, and solution systems.

BRIEF DESCRIPTION OF THE DRAWING

FIG. 1 is a plot of percent conversion versus molecular weight of a polystyrene homopolymer product obtained from a bulk or solventless stable free radical agent moderated polymerization of styrene at 130 degrees centigrade.

In an embodiment, reference FIG. 1, a monomer is polymerized in bulk or in the absence of a solvent or diluent, that is neat, using a mixture of styrene monomer, a free radical initiator, and a stable free radical agent at constant temperature. A plot of weight percent monomer conversion versus number average molecular weight indicates that a nearly linear relationship holds for this bulk polymerization and other aforementioned reaction media using stable free radical agent moderated processes of the instant invention. For example, at 20 percent conversion the number average molecular weight of the polystyrene polymer product is about 4,000 and at 65 percent conversion the number average molecular weight is about 10,000. The solid line slope of the plot was obtained by known best fit linear regression methods and supports the aforementioned belief that polymerization processes of the instant invention occur without complications arising from the known Trommsdorff effect, that is, known exothermic heating or autoacceleration of the monomer conversion reaction rate and randomization of molecular weights observed in unmoderated free radical polymerization reactions.

In embodiments, there can be incorporated into the monomer a waxy component, such as alkylenes, like polyethylene, polypropylene waxes, and mixtures thereof having a low molecular weight of from between about 1,000 to about 20,000. The use of such a component may be desirable for certain toner applications. Suitable low molecular weight waxes are disclosed in U.S. Pat. No. 4,659,641, the disclosure of which is totally incorporated herein by reference.

Toner compositions can be prepared by a number of known methods, such as admixing and heating resin particles obtained with the processes of the instant invention such as styrene butadiene copolymers, pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter.

Illustrative examples of suitable toner resins selected for the toner and developer compositions of the present invention include polyamides, styrene acrylates, styrene methacrylates, styrene butadienes, vinyl resins, including homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Other preferred toner resins include styrene/methacrylate copolymers, PLIOLITES®; suspension polymerized styrene butadienes, reference U.S. Pat. No. 4,558,108, the disclosure of which is totally incorporated herein by reference.

In toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO.Fe_2O_3$) including those commercially available as Mapico Black, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442, 835, the disclosure of which is totally incorporated herein by reference.

The low molecular weight wax materials are present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared from resins of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The following Examples are being supplied to further define various species of the present invention, it being noted that these Examples are intended to illustrate and not limit the scope of the present invention. Parts and percentages are by weight unless otherwise indicated. Comparative Examples are also provided.

COMPARATIVE EXAMPLE I

Suspension Free Radical Polymerization of Styrene Without A Stable Free Radical Agent A suspension of tricalcium phosphate (3.0 g) in a solution of Alkanol (48 mg), a naphthalene sulfonate available from DuPont, in water (100 mL) was added to a modified Parr reactor and the reactor was heated to 80° C. over 30 minutes while it was purged with nitrogen. A solution of benzoyl peroxide (2.0 g, 0.008 mol) in styrene (78 g, 0.75 mol) was added to the reactor under 60 pounds per square inch of nitrogen and the reaction was continued at 80° C. for three hours and twenty minutes. The reaction was then heated to 95° C. and continued at that temperature for an additional two hours and twenty minutes. Samples were removed from the reactor at the time interval or reaction time in minutes indicated in Table I, cooled, treated with concentrated nitric acid to dissolve the suspending agent, rinsed with water and dried. The molecular weight properties of the intermediate materials and the final polystyrene product are shown in Table I. Polydispersity ($M_w/M_n$) is indicated in the column labeled PD.

EXAMPLE I

Suspension Free Radical Polymerization of Styrene with a Stable Free Radical Agent Additive (TEMPO)

A suspension of tricalcium phosphate (3.0 g) in a solution of Alkanol (48 mg) in water (100 mL) was added to a modified Parr reactor and the reactor was heated to 80° C. over 30 minutes while it was purged with nitrogen. A solution of benzoyl peroxide (3.2 g, 0.013 mol) and TEMPO (1 g, 0.0064 mol), a stable free radical, in styrene (78 g, 0.75 mol) was added to the reactor under 60 pounds per square inch of nitrogen and the reaction was continued at 80° C. for three hours and thirty minutes. The reaction was then heated to 95° C. and continued at that temperature for an additional one hour and twenty minutes. Samples were removed from the reactor at time intervals as indicated in Table II, cooled, treated with concentrated nitric acid to dissolve the suspending agent, rinsed with water and dried. The molecular weight properties of the intermediate materials and the final polystyrene product are shown in Table II.

TABLE I

| Comparative Example I Samples | Wt. SFR (grams) | Reaction Time (min.) | $M_n$ ($10^3$) | $M_w$ ($10^3$) | PD |
| --- | --- | --- | --- | --- | --- |
| Ia | 0 | 60 | 18.9 | 33.0 | 1.75 |
| Ib | 0 | 120 | 17.9 | 32.8 | 1.83 |

TABLE I-continued

| Comparative Example I Samples | Wt. SFR (grams) | Reaction Time (min.) | $M_n$ ($10^3$) | $M_w$ ($10^3$) | PD |
| --- | --- | --- | --- | --- | --- |
| Ic | 0 | 200 | 16.4 | 32.0 | 1.95 |
| Id | 0 | 280 | 13.0 | 30.6 | 2.36 |

Table I shows the change of molecular weight with time of a typical suspension free radical polymerization reaction (control reaction). Note that high molecular weight polymers are obtained immediately (Ia) since the polymer chains are initiated and grow in milliseconds to a given length and then terminate. As the reaction continues and monomer is consumed, the $M_n$ and $M_w$ are reduced because the polymer chains initiated later in the reaction have less free monomer available for continued growth and so terminate at shorter chain lengths. As the reaction proceeds and the viscosity of the reaction medium increases, the polydispersity (PD), that is the molecular weight distribution ($M_w/M_n$), of the resin increases from 1.75 to 2.36.

TABLE II

| Example I Samples | Wt. SFR (grams) | Reaction Time (min.) | $M_n$ ($10^3$) | $M_w$ ($10^3$) | PD |
| --- | --- | --- | --- | --- | --- |
| Ia | 1.0 | 60 | 1.6 | 4.3 | 2.76 |
| Ib | 1.0 | 95 | 9.4 | 18.1 | 1.93 |
| Ic | 1.0 | 200 | 17.8 | 32.9 | 1.85 |
| Id | 1.0 | 310 | 20.4 | 38.3 | 1.87 |

Table II shows the molecular weight changes of a free radical polymerization in the presence of a stable free radical agent. At the beginning of the reaction (Ia) the molecular weight is very low but continues to increase as the reaction proceeds indicating that pseudoliving chains continue to add monomer units. In comparative Example I, in some cases monomer only adds to a given polymer chain for a fraction of a second and then termination occurs. In the presence of a stable free radical agent, monomers continue to add to a given chain over the course of several hours and will continue to add monomer units for as long as there is monomer present in the reaction mixture. The polydispersity of the final product is smaller or less disperse in the stable free radical moderated polymerization of Example I (Id) than in the Control Example I (Id). When Example I reaction is performed at temperatures below 100 degrees centigrade and the TEMPO to BPO molar ratio is less than one as is the case in Example I, only modest improvement, from 2.36 to 1.87, in polydispersity is achieved.

EXAMPLE II

Bulk Polymerization of Styrene with a Stable Free Radical Agent (TEMPO)

A solution of styrene (15 g, 0.144 mol), benzoyl peroxide (0.385 g, 0.0016 mol) and TEMPO (0.292 g, 0.0019 mol) was heated under argon for 3.5 hours at 95° C. It is assumed, based on the half-life of benzoyl peroxide (BPO) and that TEMPO is known to act as a promoter for the dissociation of benzoyl peroxide, that no benzoyl peroxide remains in the reaction mixture after this time. The reaction mixture is heated to 123° C. over a period of 45 minutes and the reaction was continued at this temperature for 69 hours. Samples were removed from the reaction mixture over the course of the reaction as indicated and the molecular weight properties of the polystyrene products and percent conversion values of these samples are summarized in Table III.

Example II demonstrates that the reaction can be conveniently accomplished in the absence of a solvent or in bulk. As indicated by the incremental increase in molecular weight the reaction appears to be proceeding via a pseudo-living mechanism. The molar ratio of TEMPO to BPO was 1.3 compared to Experiment I which had a ratio of 0.5. After the 95° C. heating period no polymeric material was observed by gel permeation chromatography(GPC). Reacting this mixture at 123° C. resulted in very narrow polydispersities (1.26). In Example II, polydispersities below the aforementioned theoretical calculated value of 1.5 for the free radical polymerization of styrene, were achieved. Note also that the polydispersity of the polystyrene product does not increase with percent conversion. This Example also provides a demonstration of achieving high percent conversions of monomer to polymer while retaining narrow polydispersities in the polymeric resin products.

TABLE III

| Example II | Reaction Time (hr) | $M_n$ ($10^3$) | $M_w$ ($10^3$) | PD | Conversion (%) |
| --- | --- | --- | --- | --- | --- |
| IIa | 21 | 1.7 | 2.2 | 1.28 | 20 |
| IIb | 29 | 3.2 | 4.1 | 1.27 | 51 |
| IIc | 45 | 6.8 | 8.2 | 1.21 | 76 |
| IId | 69 | 8.7 | 10.9 | 1.26 | 90 |

EXAMPLE III

Solution Polymerization of Styrene in Toluene with a Stable Free Radical Agent Additive A solution of styrene (7.5 g, 0.072 mol), benzoyl peroxide (0.150 g, 0.0006 mol) and TEMPO (0.097 g, 0.0006 mol) was added, under argon, to refluxing toluene (10 mL) heated in an oil bath maintained for 7 hours at 125° C. The solution was cooled and maintained at room temperature for 16 hours. The solution was thereafter heated for an additional 5.75 hours. Samples were withdrawn from the reaction mixture as indicated and the molecular weight properties of these polystyrene intermediates and products are shown in Table IV. The Example demonstrates that stable free radical agent moderated reactions can be performed in solution. The molecular weights increase with time in an incremental or linear fashion and narrow polydispersities are obtained.

Other control reactions were conducted where the reaction temperature was lower (95° C.) and the TEMPO to BPO molar ratio was lower, for example, 0.5 compared to 1.0 of Example III. The reactions employing lower temperatures and lower TEMPO to BPO molar ratios failed to proceed by a pseudoliving mechanism and appeared to proceed by a conventional free radical polymerization mechanism and as a result, high molecular weight polystyrene material was obtained early in the reaction and the polydispersity was not significantly narrower than a control. That is, at lower reaction temperatures and lower TEMPO to BPO molar ratios the polydispersity of the product polystyrenes were higher than with the conditions used for the stable free radical moderated polymerizations of styrene.

TABLE IV

| Sample | Reaction Time (hr) | $M_n$ | $M_w$ | PD |
| --- | --- | --- | --- | --- |
| IIIa | 1.25 | 680 | 1725 | 2.5 |
| IIIb | 3.6 | 1132 | 2119 | 1.9 |
| IIIc | 7.1 | 1997 | 2743 | 1.4 |
| IIId | 12.9 | 3411 | 4409 | 1.3 |

EXAMPLE IV

Bulk Polymerization of Styrene at 150° C.

A solution of styrene (15 g, 0.144 mol), benzoyl peroxide (0.150 g, 0.00062 mol) and TEMPO (0.125 g, 0.00080 mol) was heated, under argon, in an oil bath maintained at 150° C. for 6.5 hours. The molecular weight properties of the resulting polystyrene polymer are shown in Table V. By increasing the oil bath temperature from 125° C. to 150° C., the reaction times can be dramatically reduced. In Example II, the oil bath temperature was 123° C. and the reaction time for 90% conversion required about 69 hours. With an oil bath temperature of 150° C., 86% conversion can be obtained in 6.5 hours. In contrast to Example II no prior reaction at 95° C. was required and no broadening of the polydispersity results even when all reactants and reagent are immediately reacted together at high temperature.

TABLE V

| Example V | $M_n$ ($10^3$) | $M_w$ ($10^3$) | PD | Conversion (%) |
| --- | --- | --- | --- | --- |
| IVa | 14.0 | 17.3 | 1.24 | 86 |

EXAMPLE V

Bulk Polymerization of Styrene at 150° C.

A solution of styrene (15 g, 0.144 mol), benzoyl peroxide (0.075 g, 0.00031 mol) and TEMPO (0.063 g, 0.00040 mL) was heated, under argon, in an oil bath maintained at 150° C. for 7 hours. The molecular weight properties of the resulting polystyrene polymer are shown in Table VI.

EXAMPLE VI

Bulk Polymerization of Styrene at 150° C.

A solution of styrene (15 g, 0.144 mol), benzoyl peroxide (0.075 g, 0.00031 mol) and TEMPO (0.073 g, 0.00047 mol) was heated, under argon, in an oil bath maintained at 150° C. for 7 hours. The molecular weight of the resulting polystyrene polymer are shown in Table VI.

EXAMPLE VII

Bulk Polymerization of Styrene at 150° C.

A solution of styrene (15 g, 0.144 mol), benzoyl peroxide (0.075 g, 0.00031 mol) and TEMPO (0.087 g, 0.00056 mol) was heated, under argon, in an oil bath maintained at a temperature of 150° C. for 7 hours. The physical properties of the resulting polystyrene polymer are shown in Table VI.

TABLE VI

| Example | TEMPO/BPO | Mn ($10^3$) | Mw ($10^3$) | PD | Conversion (%) |
| --- | --- | --- | --- | --- | --- |
| V | 1.3 | 26.9 | 35.4 | 1.3 | 86 |
| VI | 1.5 | 16.0 | 21.1 | 1.2 | 92 |
| VII | 1.8 | 13.9 | 17.1 | 1.3 | 86 |

In Examples V, VI and VII, the ratio of benzoyl peroxide to styrene is kept constant while the molar ratio of TEMPO to benzoyl peroxide is varied. It can be seen that the TEMPO/BPO molar ratio has little affect on the conversion when the reaction is performed in an oil bath maintained at 150° C. It is believed that the difference in conversions of 86% and 92% is within experimental error of the method used to calculate percent conversion as determined by gas chromatography on a Carbowax 20M column, available from Supelco.

There is a pronounced influence of the TEMPO/BPO molar ratio on the molecular weight of the resulting polymer. As the TEMPO/BPO molar ratio is increased, the molecular weight of the resulting polymer decreases indicating that the more TEMPO that is present, the more efficient the free radical initiator, that is the same amount of free radical initiator is capable of initiating more polymer chains sooner than at lower TEMPO to BPO molar ratios. Therefore, it would appear that the free radical initiator efficiency can be influenced by the amount of stable free radical agent used.

EXAMPLE VIII

Bulk Polymerization of Styrene for High Molecular Weight Polystyrene

A solution of styrene (15 g, 0.144 mol), benzoyl peroxide (0.025 g, 0.00010 mol) and TEMPO (0.021 g, 0.00013 mol) was heated, under argon, in an oil bath maintained at 150° C. for 2.5 hours. The molecular weight properties of the resulting polymer are shown in Table VII. This experiment demonstrates that the molecular weight of the product polymer resin can be controlled by varying the amount of BPO used and that high molecular weight resins can be obtained while maintaining narrow polydispersities.

TABLE VII

| Example | $M_n$ ($10^3$) | $M_w$ ($10^3$) | PD |
| --- | --- | --- | --- |
| VIII | 57.7 | 67.0 | 1.16 |

EXAMPLE IX

Suspension Copolymerization of Styrene and Myrcene Without a Stable Free Radical Agent A suspension of tricalcium phosphate (3.0 g) in a solution of Alkanol (48 mg) in water (100 mL) was added to a modified Parr reactor and the reactor was heated to 95° C. over 30 minutes while it was purged with nitrogen. A solution of benzoyl peroxide (5.0g, 0.021 mol) and TAEC [O,O-t-amyl-O-(2-ethylhexyl)monoperoxycarbonate] (0.2 mL), in styrene (46.8 g, 0.45 mol) and myrcene (10.6 g, 0.08 mol) was added to the reactor under 60 pounds per square inch of nitrogen and the reactor was heated at 95° C. for 192 minutes, heated to 125° C. over 40 minutes and maintained at 125° C. for one hour. The reactor was cooled and the copolymer was removed from the reactor, treated with concentrated nitric acid, to dissolve residual suspension agent rinsed with water to yield a thick oil that gave a slightly off-white solid when precipitated from a methylene chloride solution into methanol. The molecular weight properties of the styrene-myrcene copolymer material are shown in Table VIII.

EXAMPLE X

Suspension Copolymerization of Styrene and Myrcene with a Stable Free Radical Agent (TEMPO)

A suspension of tricalcium phosphate (3.0 g) in a solution of Alkanol (48 mg) in water (100 mL) was added to a modified Parr reactor and the reactor was heated to 95° C. over 30 minutes while it was purged with nitrogen. A solution of benzoyl peroxide (0.30 g, 0.012 mol) and TEMPO (0.20 g, 0.0013 mol), in styrene (60 g, 0.58 mol) and myrcene (10 g, 0.07 mol) was added to the reactor under a pressure of nitrogen and the reactor was heated to 143° C. over 15 minutes and then maintained at that temperature for 7.5 hours. The reactor was cooled and the copolymer was removed from the reactor, treated with concentrated nitric acid, rinsed with water to yield a thick oil that gave a slightly off-white solid when precipitated from a methylene chloride solution into methanol. The molecular weight properties of the styrene-myrcene copolymer material are shown in Table VIII. The $^1$H NMR of the sample confirmed the product to be a copolymer of styrene and myrcene.

TABLE VIII

| Example | $M_n$ ($10^3$) | $M_w$ ($10^3$) | PD |
| --- | --- | --- | --- |
| IX | 8.7 | 38.9 | 4.4 |
| X | 19.2 | 31.3 | 1.6 |

Examples IX and X demonstrate that copolymers can be obtained and that narrow polydispersities are maintained using processes of the instant invention. The control reaction Example IX is a typical free radical suspension polymerization process that gives a copolymer with approximately the same $M_w$ as the copolymer prepared in the presence of TEMPO as Example X. The Example X reaction performed in the presence of TEMPO yielded a copolymer with a polydispersity of 1.6 which was considerably lower than the polydispersity 4.4 value obtained without a stable free radical agent present.

In Example X, in the presence of TEMPO the monomer to BPO molar ratio was 1:542, whereas, in the control reaction in Example IX the ratio was 1:25. It would appear that the TEMPO has an affect on the initiator efficiency and greatly improves it. This enhanced efficiency feature allows the use of considerably less initiator to prepare a copolymer of a given molecular weight as compared to a free radical polymerization process without a stable free radical agent present.

EXAMPLE XI

Magnetic Toner Preparation and Evaluation

The polymer resin (74 weight percent of the total mixture) obtained by the stable free radical polymerization processes in Example I may be melt extruded with 10 weight percent of REGAL 330® carbon black and 16 weight percent of MAPICO BLACK® magnetite at 120° C., and the extrudate pulverized in a Waring blender and jetted to 8 micron number average sized particles. A positively charging magnetic toner may be prepared by surface treating the jetted toner (2 grams) with 0.12 gram of a 1:1 weight ratio of AEROSIL R972● (Degussa) and TP-302 a naphthalene sulfonate and quaternary ammonium salt (Nachem/ Hodogaya SI) charge control agent.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR®, a polyvinylidene fluoride, and 30 percent by weight of polymethyl methacrylate; the coating weight being about 0.9 percent. Cascade development may be used to develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox 5028® soft silicone roll fuser, operated at 3 inches per second.

The minimum fix and hot offset temperatures (in °F.) of stable free radical polymerization polymers having narrow polydispersities as toners are expected to be improved over toners prepared from resins synthesized by a free radical polymerization process without a stable free radical agent present affording broad polydispersities. The actual fuser roll temperatures may be determined using an Omega pyrometer and was checked with wax paper indicators. The degree to which a developed toner image adhered to paper after fusing is evaluated using a Scotch® tape test. The fix level is expected to be excellent and comparable to that fix obtained with toner compositions prepared from other methods for preparing toners having resins with high molecular weights and narrow polydispersities. Typically greater than 95 percent of the toner image remains fixed to the copy sheet after removing a tape strip as determined by a densitometer.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N' -bis(3-methylphenyl)1,1'-biphenyl-4,4'-diamine, 45 weight percent, dispersed in 55 weight percent of the polycarbonate MAKROLON®, reference U.S. Pat. No. 4,265,990, the disclosure of which is totally incorporated herein by reference; images for toner compositions prepared from the copolymers derived from for example, Example XI are expected to be of excellent quality with no background deposits and of high resolution over an extended number of imaging cycles exceeding, it is believed, about 75,000 imaging cycles.

Other toner compositions may be readily prepared by conventional means from the polymer and copolymer resins of the present invention including colored toners, single component toners, multicomponent toners, toners containing special performance additives, and the like.

The aforementioned stable free radical agent moderated polymerization process may be applied to a wide range of organic monomers to provide novel toner resin materials with desirable electrophotographic properties. For example, the block copolymers have application as dispersants for photoreceptor pigments. The multimodal resins have application to low melt resins and certain monomodal resins may be used to modify the surface of carbon black and pigment particles to make the pigment particles more miscible with a host polymer or dispersing medium. Narrow molecular weight resins such as poly(styrene-butadiene) find application as improved toner resins for general application.

Other modifications of the present invention may occur to those skilled in the art based upon a review of the present application and these modifications, including equivalents thereof, are intended to be included within the scope of the present invention.

What is claimed is:

1. A toner composition comprised of pigment particles, and resin comprised of at least one polymer or copolymer obtained by a free radical polymerization process comprising:

heating a mixture of a free radical initiator, a stable free radical agent, and at least one polymerizable monomer compound to form said polymer or copolymer with a high monomer to polymer conversion;

cooling said mixture;

optionally isolating said polymer or copolymer; and optionally washing and drying said polymer or copolymer.

2. A toner composition comprised of pigment particles, and at least one resin obtained from the polymerization process comprising:

heating a first mixture comprised of a free radical initiator, a stable free radical agent, and at least one polymerizable monomer compound to form a first intermediate product resin;

optionally cooling said first mixture;

adding to said first intermediate product resin a second mixture comprised of a free radical initiator, a stable free radical agent, and at least one polymerizable monomer compound, wherein said polymerizable monomer compound of said second mixture contains the same monomer components as said polymerizable monomer compound of said first mixture, and said free radical initiator and said stable free radical agent of said second mixture are the same or different from said free radical initiator and said stable free radical agent of said first mixture, and wherein there is formed a combined mixture;

heating said combined mixture to form a third mixture comprised of a mixture of thermoplastic resins comprised of a first product resin formed from said first intermediate product resin and added said second monomer and a second product resin formed from substantially only said second monomer;

cooling said third mixture;

optionally isolating said mixture of thermoplastic product resins from said third mixture; and optionally washing and drying said mixture of thermoplastic resins and wherein said first product resin and said second product resin each possess a narrow polydispersity of about 1 to about 2.

3. The toner composition in accordance with claim 2 wherein said at least one resin is a mixture comprised of a high and a low molecular weight average resin each with a weight average molecular weight (Mw) of from about 10,000 to about 200,000, a number average molecular weight (Mn) of from about 9,000 to about 100,000, and a polydispersity of about 1.1 to about 2.0.

4. The toner in accordance with claim 2 wherein a reaction does not occur between the free radical initiator and the stable free radical.

5. The toner in accordance with claim 2 wherein the stable free radical agent is of 2,2,6,6-tetramethyl-1-piperidinyloxy and the free radical initiator is benzoyl peroxide.

6. The toner in accordance with claim 2 wherein cooling the ultimate mixture to below about 100° C. is accomplished by heating termination.

7. The toner in accordance with claim 2 wherein each said resin has a polydispersity of about 1.0 to about 1.45.

8. The toner in accordance with claim 1 wherein a plurality of resins are selected.

9. The toner in accordance with claim 1 wherein a single resin type is selected.

10. The toner in accordance with claim 1 wherein the resin has a free radical initiator molecular fragment at one end and stable free radical agent covalently bonded at the other end of the resin.

11. A toner composition comprised of pigment particles, and a resin comprised of at least one resin obtained from the polymerization process comprising:

heating a first mixture comprised of a free radical initiator, a stable free radical agent, and at least one polymerizable monomer compound to form a first intermediate product resin;

optionally cooling said first mixture;

optionally isolating said first intermediate product resin;

adding to said first intermediate product resin a second mixture comprised of at least one polymerizable monomer compound, wherein said polymerizable monomer compound of said second mixture is different from said polymerizable monomer compound of said first mixture, to form a combined mixture;

heating said combined mixture to form a third mixture comprised of a block copolymer thermoplastic resin comprised of a first product resin formed from said first intermediate product resin and added said second monomer;

cooling said third mixture containing said block copolymer thermoplastic resin;

optionally isolating said block copolymer thermoplastic resin from said third mixture; and optionally washing and drying said block copolymer thermoplastic resin wherein said block copolymer thermoplastic resin possesses a narrow polydispersity of about 1 to about 2.

12. A toner composition in accordance with claim 11 wherein said block copolymer resin possesses a weight average molecular weight ($M_w$) of from about 10,000 to 200,000, a number average molecular weight ($M_n$) of from about 9,000 to about 100,000 and a polydispersity of about 1.1 to about 1.5.

13. The toner in accordance with claim 11 wherein cooling to below about 100° C. is accomplished by heating termination and wherein the ultimate mixture attains a temperature of about 25° C. thereafter.

14. A process for the preparation of toner, which comprises heating at a temperature of from about 100 to about 160° C. a mixture of free radical initiator, stable free radical agent, pigment, and a least one monomer component, to provide said toner comprised of resin and pigment, and which resin has a polydispersity of from about 1.1 to about 2, and wherein the monomer to resin conversion is at least about 50 percent.

15. A process in accordance with claim 14 wherein a reaction product does not form directly between the free radical initiator and the stable free radical agent.

16. A process for the preparation of developer comprising heating at a temperature of from about 100 to about 160° C. a mixture of free radical initiator, stable free radical agent, pigment, and a least one monomer component to form a toner resin, which resin has a polydispersity of from about 1.1 to about 2, and the monomer to resin conversion is at least about 50 percent; and thereafter mixing said resin with carrier particles, to afford said developer.

* * * * *